United States Patent [19]

Saitoh et al.

[11] Patent Number: 4,750,073
[45] Date of Patent: Jun. 7, 1988

[54] MAGNETIC RECORDING/REPRODUCING APPARATUS

[75] Inventors: Mitsuyoshi Saitoh, Kanagawa; Kunio Sekine, Yokohama, both of Japan

[73] Assignee: Kabushiki Kaisha Toshiba, Kawasaki, Japan

[21] Appl. No.: 847,444

[22] Filed: Apr. 3, 1986

[30] Foreign Application Priority Data

Apr. 8, 1985 [JP] Japan .................................. 60-73846

[51] Int. Cl.⁴ ...................... G11B 23/00; G11B 15/60
[52] U.S. Cl. ................................. 360/131; 360/130.3; 360/130.34
[58] Field of Search ...................... 360/131, 102–103, 360/130.3, 130.34

[56] References Cited

U.S. PATENT DOCUMENTS

| | | | |
|---|---|---|---|
| 3,327,916 | 1/1967 | Weidenhammer et al. | 360/102 X |
| 3,435,442 | 3/1969 | Ma et al. | 360/102 |
| 4,285,019 | 8/1981 | Scott et al. | 360/103 |
| 4,330,804 | 5/1982 | De Moss | 360/103 X |
| 4,396,965 | 8/1983 | De Moss | 360/102 |

Primary Examiner—John H. Wolff
Attorney, Agent, or Firm—Oblon, Fisher, Spivak, McClelland & Maier

[57] ABSTRACT

A magnetic recording/reproducing apparatus, which performs at least one of the two functions of recording and reproducing by using a flexible magnetic recording medium with a magnetic recording layer of a thin metal film, and which has a magnetic head, a drive unit and a recording/reproducing circuit. The drive unit causes a relative movement between the magnetic head and the magnetic recording medium in accordance with recording/reproducing. The recording/reproducing apparatus is operated in accordance with the drive unit and inputs/outputs a recording/reproducing signal with respect to the magnetic head. The magnetic head is formed such that its surface contacting the magnetic recording medium has a radius of curvature of 40 to 100 mm. The speed of relative movement of the drive unit at least in the access mode is 1.5 to 5.0 m/s.

11 Claims, 4 Drawing Sheets

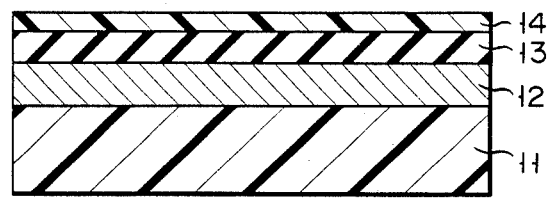
F I G. 4
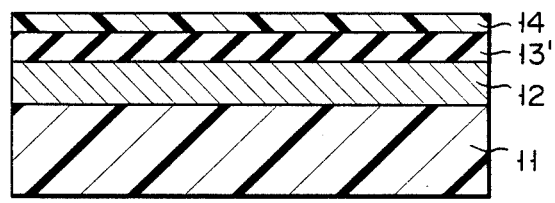
F I G. 5
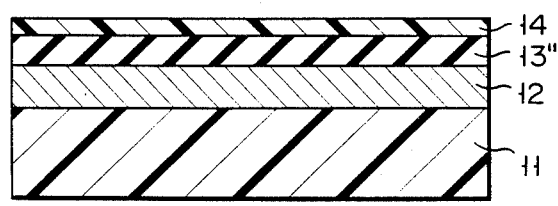
F I G. 6
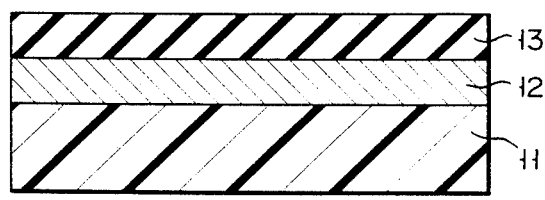
F I G. 7

4,750,073

MAGNETIC RECORDING/REPRODUCING APPARATUS

BACKGROUND OF THE INVENTION

The present invention relates to a magnetic recording/reproducing apparatus, wherein service life of a magnetic recording medium and magnetic head can be lengthened.

Developments in information processing techniques have recently been rapidly accelerating. Along with this, the amount of information that must be contained in a memory device has increased. In order to cope with this situation, research into increased recording densities in magnetic recording apparatuses such as floppy disk apparatuses has been ongoing. This research includes development of magnetic recording mediums, i.e., so-called magnetic metal recording mediums which utilize as a magnetic recording layer a thin magnetic metal film of Co-Cr or the like. The magnetic metal recording medium appears promising as an efficient medium for high-density recording.

A magnetic metal recording medium has a drawback in that scratching and wearing down of the medium tend to occur relatively sooner and relatively more frequently than in conventional particulate media. To prevent this, various countermeasures, including the provision of a protective layer on the surface of the medium, have been researched. However, a satisfactory answer to the problem has not yet been found.

SUMMARY OF THE INVENTION

It is an object of the present invention to provide a magnetic recording/reproducing apparatus wherein various problems such as scratching and wear arising from friction between a magnetic head and a magnetic recording medium are effectively limited to prolong the service life of the medium, thereby improving the reliability of both the medium and the apparatus.

In a magnetic recording/reproducing apparatus of the present invention, recording/reproducing is performed only on/from one side of a magnetic recording medium between the flexible magnetic recording medium and a magnetic head. The radius of curvature of a slide surface (to be referred to as head surface hereinafter) of the magnetic head in contact with the magnetic recording medium is set at 40 to 100 mm, and the relative speed between the magnetic head and the magnetic recording medium in both recording and reproducing modes is set at 1.5 to 5.0 m/s.

According to the magnetic recording/reproducing apparatus of the present invention, since the head surface of the magnetic head has the above specific radius of curvature and the relative speed between the magnetic recording medium and the magnetic head are set to the above specific values, the magnetic head floats above the recording medium without degrading magnetic recording/reproducing characteristics. As a result, the friction coefficient between the magnetic head and the recording medium can be greatly decreased. Since the relative speed is sufficiently high, the data transfer rate in the recording/reproducing mode can be increased.

This effect was confirmed by experiments conducted by the present inventors. FIG. 1 shows the relationship between the friction coefficient and the relative slide speed between a magnetic head and a recording medium when the magnetic head has a spherical head surface with a radius of curvature of 50 mm contacting the magnetic recording medium. As is apparent from FIG. 1, when the slide speed is 1.5 m/s or more, the friction coefficient can be reduced to 0.1 or less.

FIG. 2 shows the relationship between the radius of curvature of the head surface of the magnetic head and the friction coefficient when the slide speed between the magnetic head and the magnetic recording medium is 2 m/s. As is apparent from FIG. 2, the friction coefficient can be maintained at 0.1 or less when the radius of curvature of the magnetic head falls within a range of 40 to 400 mm. Therefore, when the slide speed and the radius of curvature are set as above, the friction coefficient between the magnetic head and the magnetic recording medium can be greatly reduced.

As a result, according to the present invention, the service life of a magnetic recording medium can be effectively extended, and the reliability thereof can be increased.

BRIEF DESCRIPTION OF THE DRAWINGS

FIG. 4 is a sectional view of part of a magnetic recording medium used in the apparatus of FIG. 3; and FIGS. 5 to 7 are sectional views, respectively, of part of magnetic recording media used in other embodiments of the present invention.

DETAILED DESCRIPTION OF THE PREFERRED EMBODIMENTS

[First Embodiment]

Figure 1:
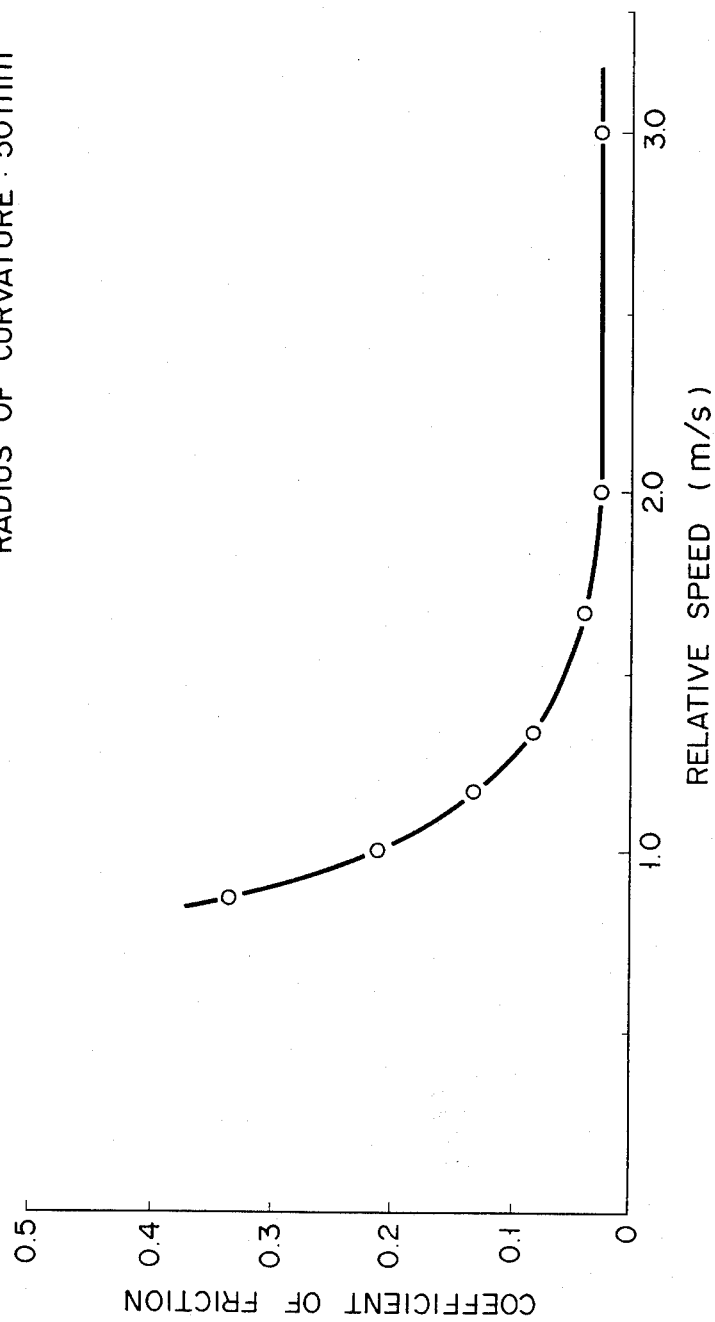
FIG. 1 shows the relationship between the friction coefficient and the relative slide speed between a magnetic head and a magnetic recording medium when the head surface of the magnetic head is a spherical surface with a radius of curvature of 50 mm for explaining the principle of the present invention.
Figure 2:
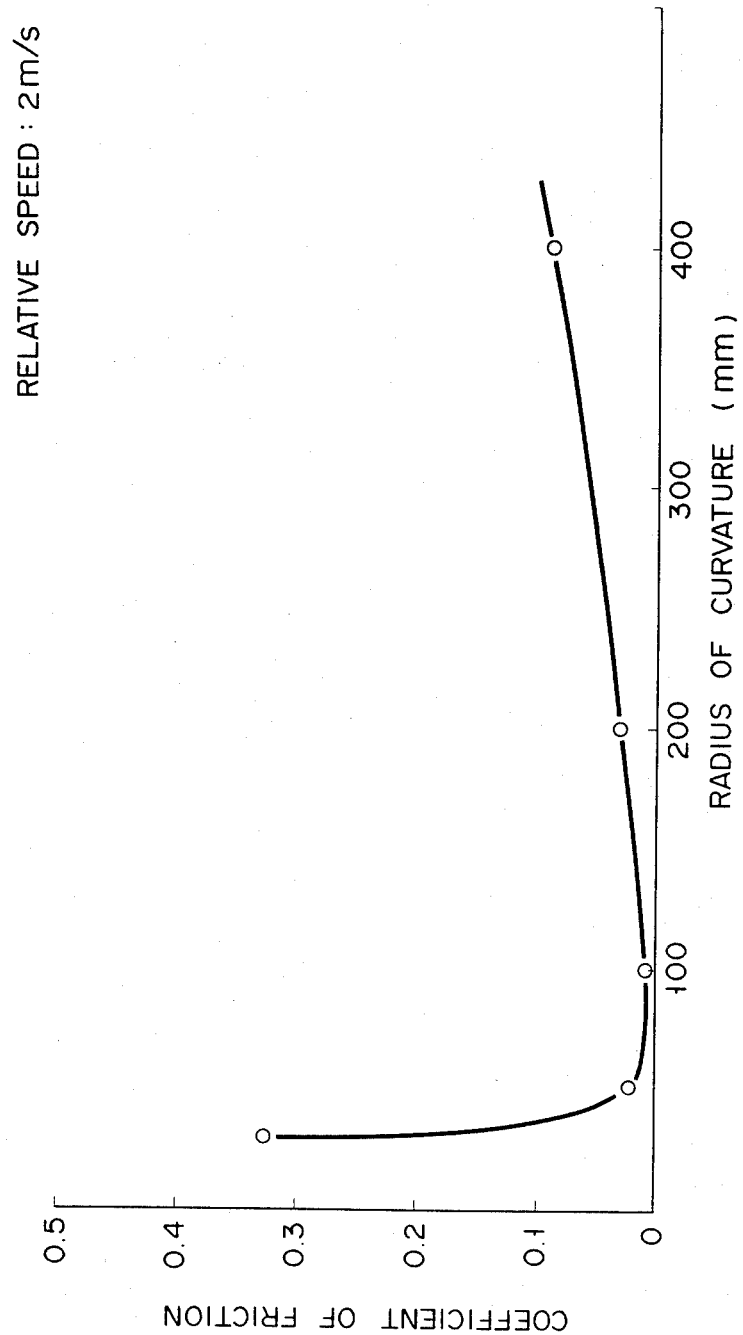
FIG. 2 shows the relationship between the radius of curvature of the head surface of the magnetic head and the friction coefficient when the slide speed between the magnetic head and the magnetic recording medium is 2 m/s for explaining the principle of the present invention.
Figure 3:
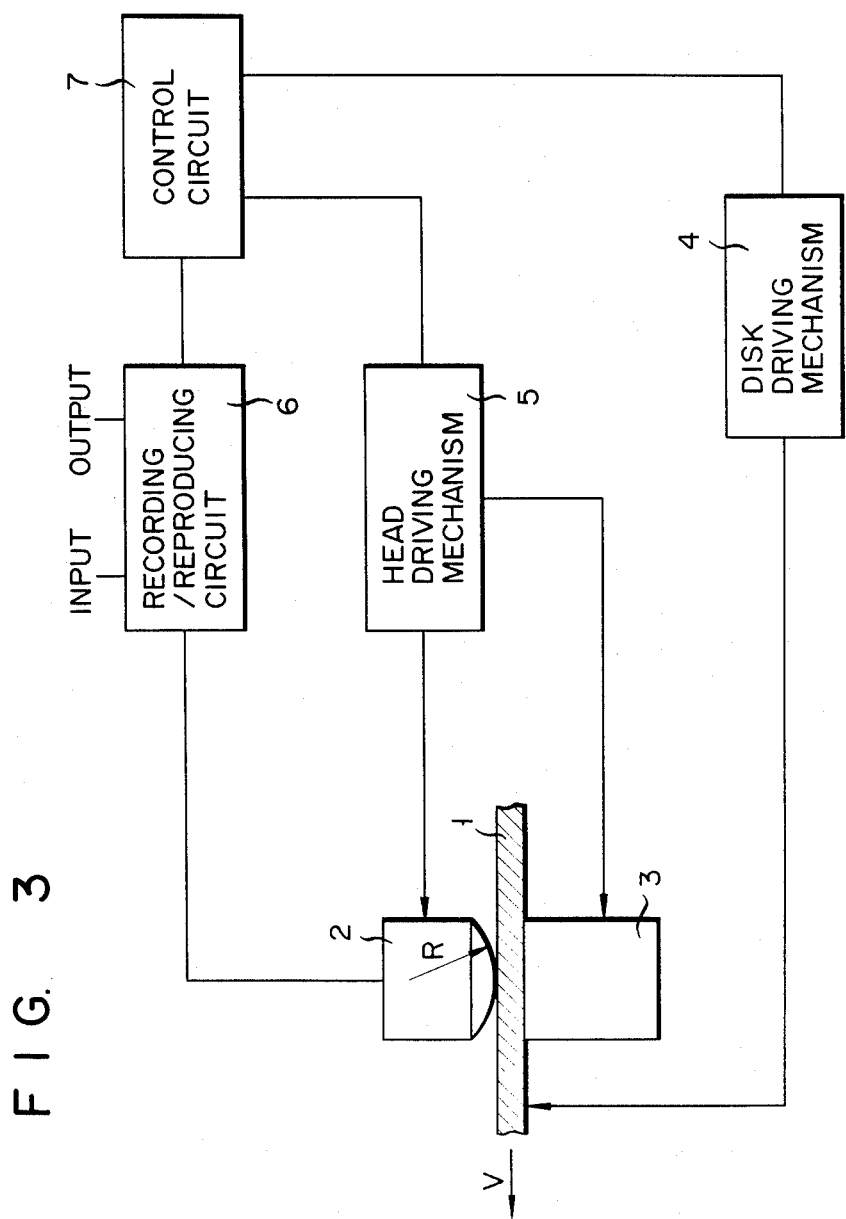
FIG. 3 schematically shows an arrangement of a magnetic recording/reproducing apparatus according to an embodiment of the present invention.

A magnetic recording/reproducing apparatus according to a first embodiment of the present invention will be described with reference to FIG. 3. In this embodiment, the present invention is applied to a single-sided floppy disk apparatus which uses floppy disk 1 as a flexible disk-like magnetic recording medium. Magnetic head 2 having a spherical head surface with radius of curvature R of 50 mm is provided for recording/reproducing disk 1. Felt pad 3 is arranged to oppose the head surface of head 2 through disk 1. Disk 1 is rotated by disk driving mechanism 4. Head 2 and pad 3 are driven in the radial direction of disk 1 and to approach and separate therefrom. More specifically, head 2 and pad 3 are driven by head drive mechanism 5 to move in two different manners. First, head 2 and pad 3 are moved in the radial direction of disk 1 so as to be correctly positioned on a predetermined recording/reproducing track and to switch the recording/reproducing track. Second, head 2 and pad 3 are brought into contact with disk 1 by a predetermined pressure in the access, i.e., recording/reproducing mode, and are otherwise separated from disk 1, i.e., in a wait or seek mode. Thus, approach and separation movement with respect to disk 1 is performed in the wait or seek mode. Head 2 is connected to recording/reproducing circuit 6. Circuit 6 supplies a recording signal corresponding to an input to head 2 and detects and outputs a reproduction signal from head 2. Mechanisms 4 and 5 and circuit 6 are controlled by control circuit 7. Gaining access to disk 1 is performed by the interlocked operation of mechanisms 4 and 5, and circuit 6 controlled by circuit 7. Mechanism 4 drives disk 1 so as to obtain a relative speed of 1.5 to 5.0 m/s between disk 1 and head 2.

Magnetic recording medium 1 is obtained by forming magnetic recording layer 12 of a thin Co-Cr metal film on substrate 11 of a flexible resin film, forming $Si_3N_4$ protective layer 13 thereon, and forming fluorine-series lubricating oil layer 14 thereon by spin coating.

Spin coating is used to drop lubricating oil 14 on a central portion of substrate 11 having layers 12 and 13 thereon while substrate 11 is being rotated at a high speed, so that oil 14 disperses across the surface of layer 13 by a centrifugal force, thereby forming layer 14 on the surface of medium 1.

Medium 1 is rotated by mechanism 4 such that relative speed v between medium 1 and head 2 is 1.5 to 5.0 m/s. During access, head 2 and medium 1 are brought into contact with each other at a predetermined pressure by movement of head 2 and pad 3 by mechanism 5.

The following experiments were conducted to confirm the effect of the first embodiment of the present invention.

[Experiment 1]

An experiment was performed with the arrangement of the first embodiment, and the service life of disk 1 was studied.

Head 2 (having a head surface with radius of curvature R of 50 mm) was movably supported by an air bearing. Felt pad 3 was arranged to oppose head 2 through medium 1. Medium 1 was rotated such that relative speed v between medium 1 and head 2 was 2.2 m/s, and head 2 and medium 1 were brought into contact with each other at a predetermined surface pressure.

A track on medium 1 on which head 2 slides was repeatedly reproduced to determine how many times medium 1 can be rotated before its output is decreased by 20% of the initial output. The result was an index representing the service life of medium 1. A service life of 15 million rotations was confirmed in Experiment 1.

[Control Experiment 1]

The following experiment was also conducted as a control of Experiment 1.

The service life of a medium was examined under the same conditions as in Experiment 1 except that the relative speed of head 2 and medium 1 was set to 1.0 m/s. Then, a service life of 2.8 million rotations was obtained.

[Second Embodiment]

In the second embodiment of the present invention, $Al_2O_3$ protective layer 13' was provided in place of $Si_3N_4$ protective layer 13 in medium 1 of the first embodiment.

[Experiment 2]

The service life of a medium with a structure according to the second embodiment was examined by setting the relative speed of head 2 and medium 1 at 2.5 m/s. A service life of 8.5 million rotations was obtained.

[Control Experiment 2]

The service life of a medium was examined using a magnetic head having a radius of curvature of 30 mm in place of head 2 used in the second embodiment and setting the relative speed of the magnetic head and the magnetic recording medium to 1.1 m/s. A service life of 2 million rotations was obtained.

[Third Embodiment]

In the third embodiment of the present invention, $SiO_2$ protective layer 13'' was provided in place of $Si_3N_4$ protective film 13 in medium 1 in the first embodiment.

[Experiment 3]

The service life of a medium with a structure according to the third embodiment was examined in the same manner as described above by setting the relative speed of head 2 and medium 1 to 2.7 m/s. A service life of 12 million rotations was obtained.

As described above, by the Experiments corresponding to the three embodiments of the present invention and the two Control Experiments not corresponding to the present invention, it was confirmed that the service life of the magnetic recording medium of the present invention is considerably longer than that of the Control Experiments. This is attributable to the following reason. Namely, when the slide speed of the magnetic head and the magnetic recording medium exceeds a specific value, a hydrodynamic force acts to separate them and a spacing gap is formed between them, thereby decreasing their friction coefficient. However, when the radius of curvature of the magnetic head exceeds 100 mm or when the slide speed exceeds 5.0 m/s, the spacing gap between the magnetic head and the medium becomes too large, making high-density recording difficult.

Other preferable conditions were obtained as follows from various experiments.

The hardness of protective layers 13, 13' and 13'' is preferably 1,000 kg/mm$^2$ or more.

The pressure of the felt pad against the magnetic recording medium is preferably 5 to 20 gf; the contact area between the felt pad and the magnetic recording medium, 3 mm$^2$ or more; the Young's modulus of substrate 11, 600 to 800 kg/mm$^2$; the thickness of substrate 11, 50 to 100 μm; and the total thickness of layer 13 and lubricating oil layer 14, 0.005 to 0.05 μm.

The present invention is not limited to the above three embodiments. It has been confirmed that the same effect as above can be obtained if the radius of curvature of the magnetic head is 40 to 100 mm and the slide speed of the magnetic head and the magnetic recording medium is 1.5 to 5.0 m/s.

The present invention can be applied to an apparatus which uses a recording medium shown in FIG. 7. This magnetic recording medium has a triple-layered structure consisting of substrate 11, magnetic recording layer 12 and protective layer 13. In this case, it is preferable that an unwoven fabric impregnated with a lubricating oil is placed between the magnetic recording medium and the package for housing the same. Also, the present invention can be applied not only to a magnetic recording/reproducing apparatus using a metal magnetic recording medium with Co-Cr as a recording layer, but also to an apparatus using another magnetic metal recording medium or Ba ferrite.

The head surface need not be spherical as long as it has a radius of curvature falling within the range mentioned above.

What is claimed is:

1. A magnetic recording/reproducing apparatus which uses a disk-like flexible magnetic recording medium having a high-density magnetic recording layer comprising a thin metal film and which performs at least one of two functions of recording/reproducing on/from only one side of the magnetic recording medium, comprising:
    a magnetic head having a contact surface with a radius of curvature of 40 to 100 mm for contacting the magnetic recording medium;
    a pad means for pushing said magnetic recording medium against said magnetic head with a predetermined pressure;
    a drive unit for causing a relative movement between said magnetic head and the magnetic recording medium such that a relative speed therebetween is 1.5 to 5.0 m/s at least in an access mode; and
    a recording/reproducing circuit, operated in response to said drive unit, for inputting/outputting a recording/reproducing signal with respect to said magnetic head.

2. An apparatus according to claim 1, wherein the surface of said magnetic head which contacts the recording medium is a spherical surface with a radius of curvature of 40 to 100 mm.

3. An apparatus according to claim 1, wherein the magnetic recording medium is obtained by forming a magnetic recording layer on a substrate, forming a hard protective layer with a hardness of not less than 1,000 kg/mm$^2$ on the magnetic recording layer, and forming a lubricating oil layer on the protective layer.

4. An apparatus according to claim 3, wherein the magnetic recording layer of the magnetic recording medium is a Co-Cr thin metal film.

5. An apparatus according to claim 3, wherein the magnetic recording layer of the magnetic recording medium comprises Ba (barium) ferrite.

6. An apparatus according to claim 3, wherein the protective layer of the magnetic recording medium comprises $Si_3N_4$.

7. An apparatus according to claim 3, wherein the protective layer of the magnetic recording medium comprises $Al_2O_3$.

8. An apparatus according to claim 3, wherein the protective layer of the magnetic recording medium comprises $SiO_2$.

9. An apparatus according to claim 3, wherein the lubricating oil layer of the magnetic recording medium comprises a fluorine-series lubricating oil.

10. An apparatus according to claim 1, wherein the magnetic recording medium is obtained by forming a magnetic recording layer on a substrate and forming a hard protective layer with a hardness of not less than 1,000 kg/mm$^2$ on the magnetic recording layer.

11. An apparatus according to claim 10, wherein the magnetic recording layer of the magnetic recording medium comprises a Co-Cr thin metal film.

* * * * *